F. E. ZAISS.
MACHINE FOR FORMING CANDY.
APPLICATION FILED OCT. 18, 1917.

1,304,140.

Patented May 20, 1919.
4 SHEETS—SHEET 1.

Witness:
John Enders

Inventor:
Fred E. Zaiss
by Fred Gerlach
his Atty.

F. E. ZAISS.
MACHINE FOR FORMING CANDY.
APPLICATION FILED OCT. 18, 1917.
1,304,140.
Patented May 20, 1919.
4 SHEETS—SHEET 3.
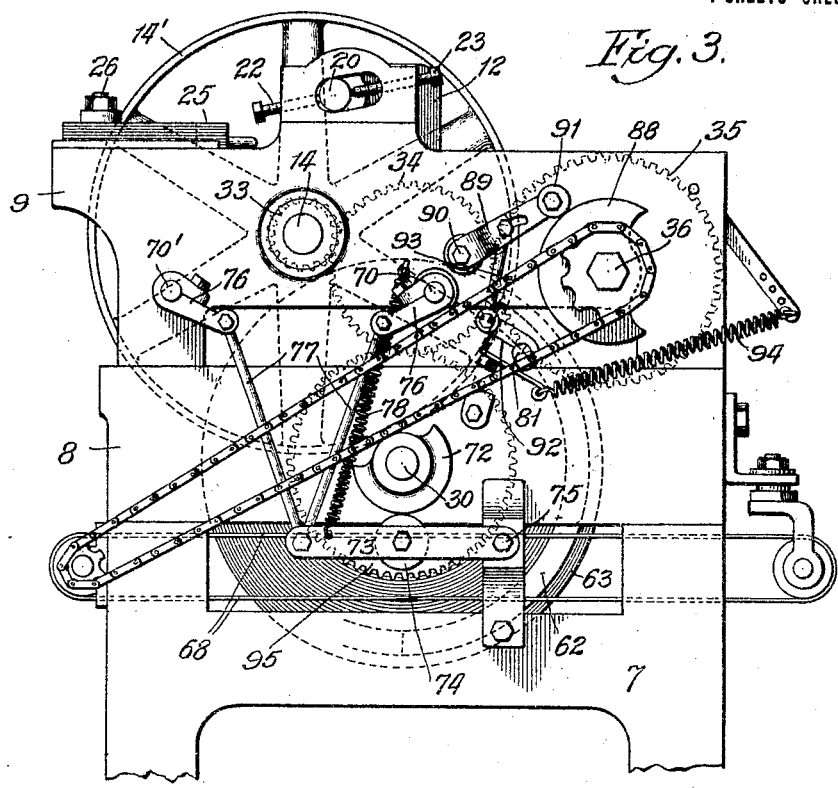
Fig. 3.
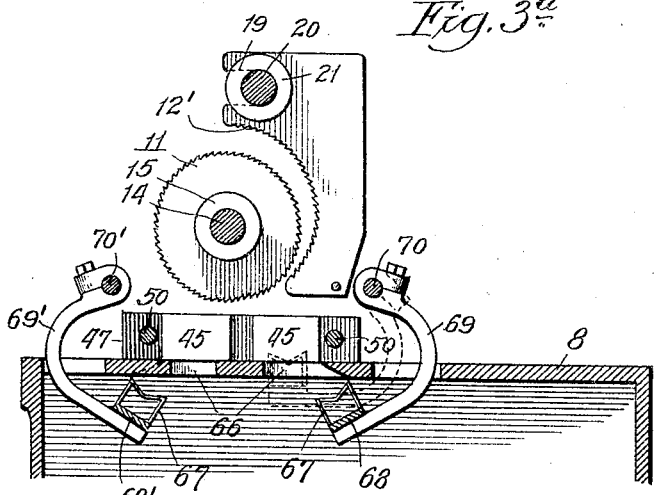
Fig. 3ª.
Witness:
John Enders
Inventor:
Fred E. Zaiss
by Fred Gerlach
his Atty.

F. E. ZAISS.
MACHINE FOR FORMING CANDY.
APPLICATION FILED OCT. 18, 1917.
1,304,140.
Patented May 20, 1919.
4 SHEETS—SHEET 4.
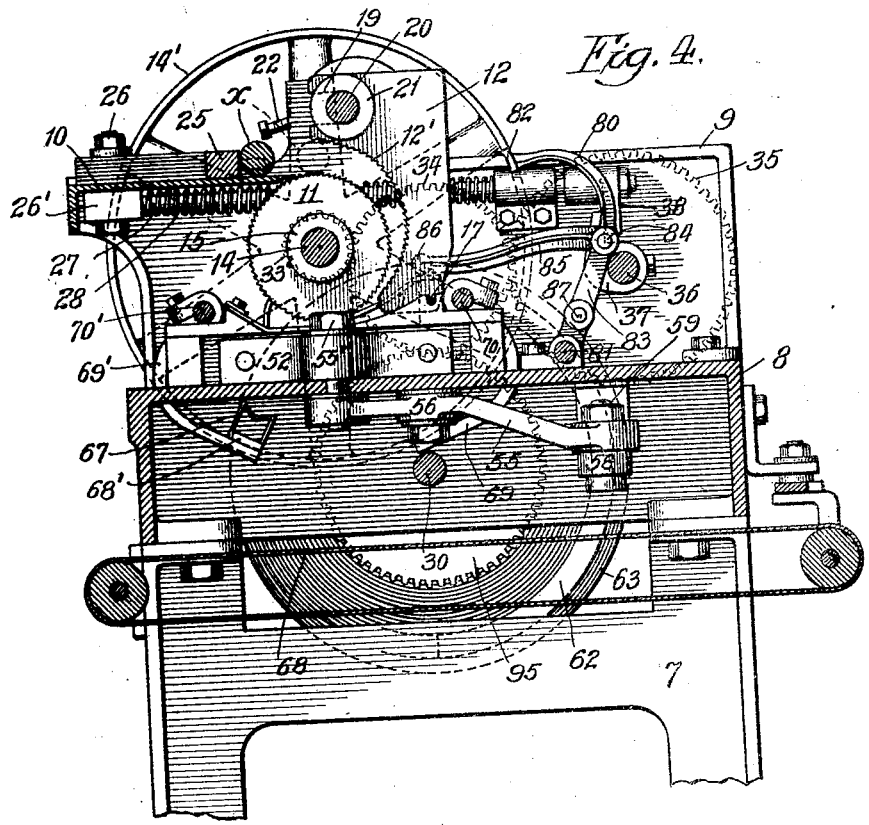
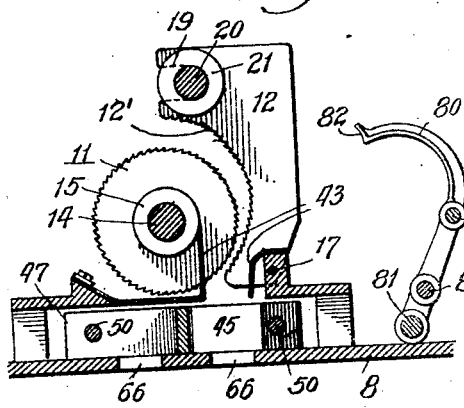
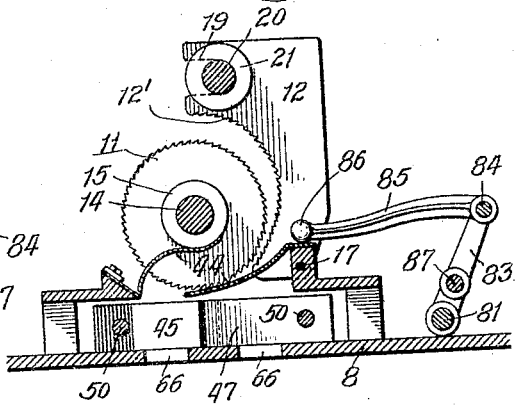
Witness:
John Enders
Inventor:
Fred E. Zaiss
by Fred Gerlach
his Atty.

UNITED STATES PATENT OFFICE.

FRED E. ZAISS, OF CHICAGO, ILLINOIS.

MACHINE FOR FORMING CANDY.

1,304,140.  Specification of Letters Patent.  Patented May 20, 1919.

Application filed October 18, 1917. Serial No. 197,178.

*To all whom it may concern:*

Be it known that I, FRED E. ZAISS, a citizen of the United States, and a resident of Chicago, in the county of Cook and State of Illinois, have invented certain new and useful Improvements in Machines for Forming Candy, of which the following is a full, clear, and exact description.

The invention relates to machines for forming candy and more particularly to a product formed of cutting a long stick which is usually striped or otherwise ornamented, into a series of small pieces which are then pressed into desired form.

One object of the present invention is to provide an improvement upon the machine set forth in an application filed by me August 7, 1916 Serial No. 113,475.

A further object of the invention is to simplify the construction of said machine and to provide mechanism for positively delivering the pieces of candy from the cutting mechanism into presser devices. Other objects of the invention will appear from the following description.

The invention consists in the several novel features hereinafter set forth and more particularly defined by claims at the conclusion hereof.

Figure 1:
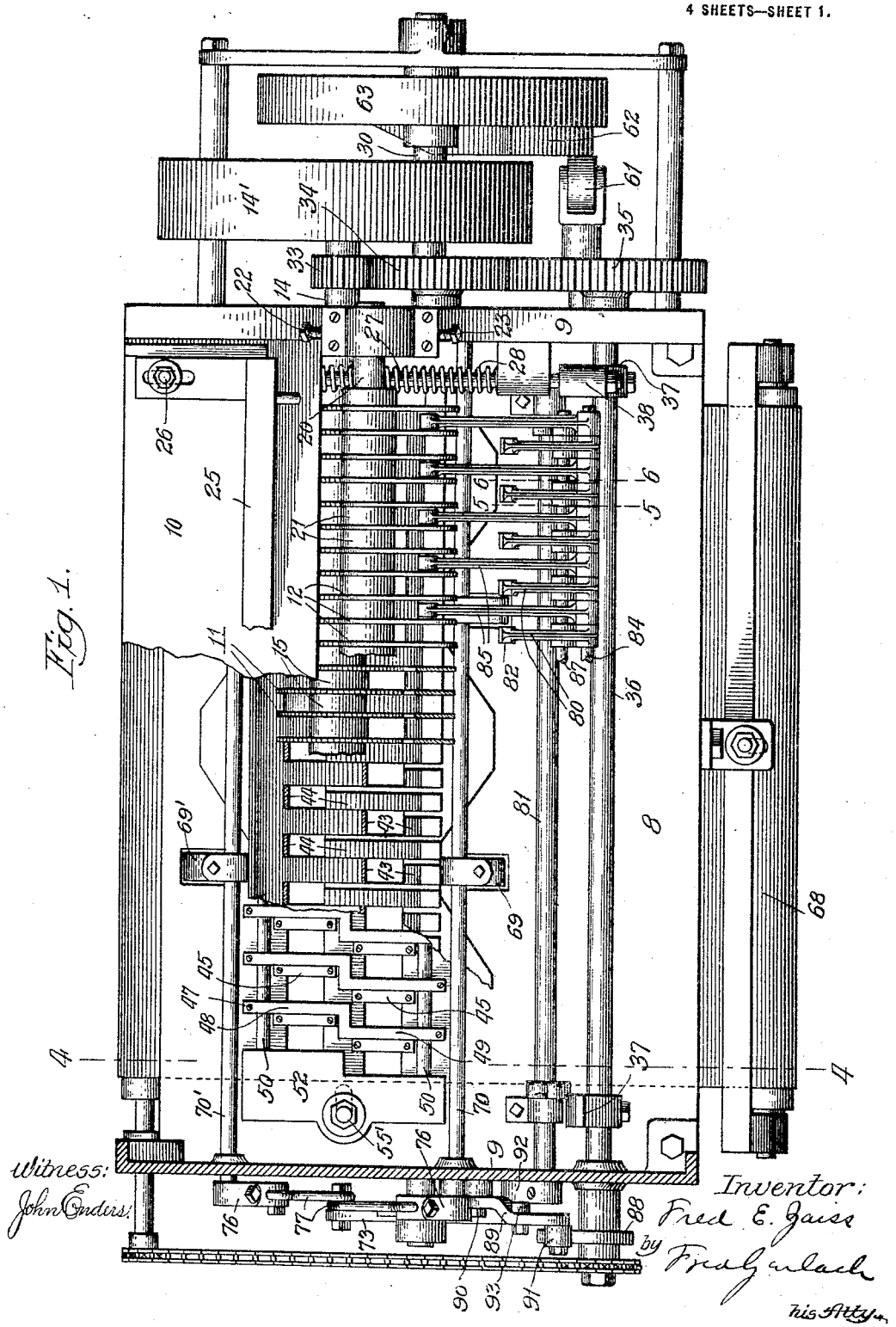
Figure 2:
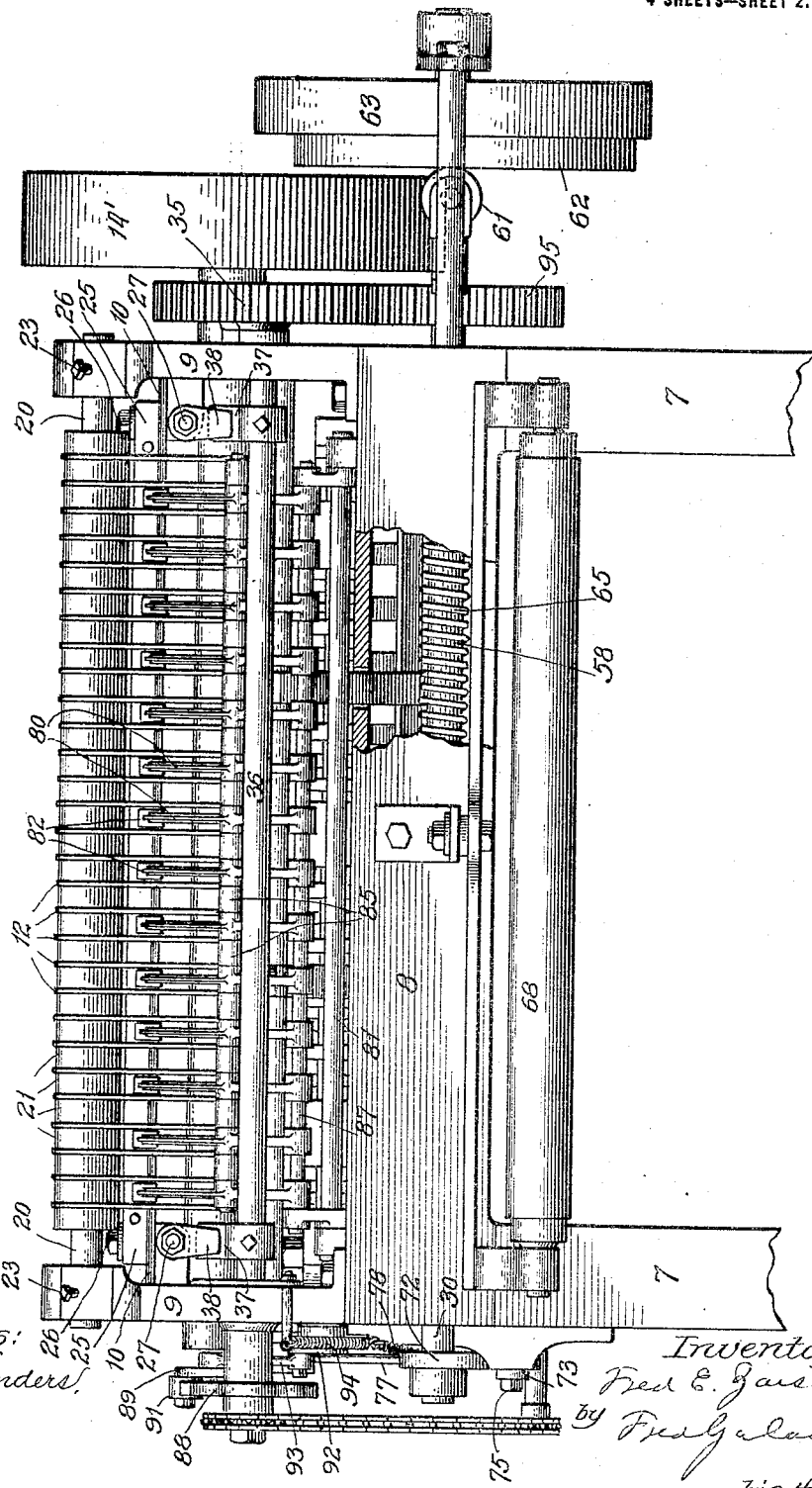

In the drawings: Figure 1 is a plan, parts being broken away. Fig. 2 is a rear elevation. Fig. 3 is a side elevation, parts being broken away. Fig. 3ª is a detail of the bottom-members of the presser-devices and their operating arms. Fig. 4 is a vertical section taken on line 4—4 of Fig. 1. Fig. 5 is a section taken on line 5—5 of Fig. 1. Fig. 6 is a section taken on line 6—6 of Fig. 1.

The several mechanisms of the machine are sustained by a supporting structure comprising lower frame-sides 7, a table 8 mounted on said sides, and upper frame-sides 9 bolted to said table. The machine generally comprises a gang of cutting devices for severing a long stick into small pieces and presser devices to which the pieces are delivered and in which they are pressed into the desired form. The sticks of candy are usually plastic when fed into the machine but become hard after they have been formed.

Mechanism is provided for feeding the sticks at proper intervals to the cutting mechanism. A plate 10 fixedly mounted upon the upper frame-sides 9 is adapted to receive a stick of candy $x$. This plate is adapted to hold the stick for delivery to a gang of cutting devices whereby the entire stick will be simultaneously rolled and cut into short pieces. The cutting-mechanism consists of rotary, circular saw-toothed blades 11 which are in coacting relation with a corresponding gang of stationary saw-toothed cutters 12. The cutting edge 12' of each cutter 12 has its upper portion spaced away from its coöperating rotating cutter a distance corresponding substantially to the thickness of the stick of candy $x$, and from this point, the edge 12' is curved and approaches the rotary cutter to its lower end, where it approaches the edge of the rotary cutter, so closely that the stick in its passage between the cutters will be severed. During the operation of the stick by the cutting mechanism, the stick will be rolled or rotated on its axis and the cutters will form grooves in the stick of a gradually increasing depth until the pieces have been completely severed from one another. The rotary cutters 11 are mounted on a shaft 14 which is journaled in side-frames 9 and are held in spaced relation corresponding to the length of the pieces of candy into which the stick is to be cut by spacing washers 15. The stationary cutters 12 are formed with holes through which a rod 17 is extended to properly support their lower portions. The upper ends of the cutters 12 are slotted, as at 19, and are secured on a rod 20 which is adjustably mounted in the frame-sides 9. Rings 21 hold the upper portions of the cutters 12 in properly spaced relation. Rod 20 is adjustably held between set screws 22 and 23 by which the rod may be adjusted to bring the upper portions of the cutting edges 12' closer or farther from the rotary cutters to adapt the machine for candy sticks of different thicknesses.

A push-bar 25 is slidably mounted on the plate 10 and is adapted to feed a stick placed on said plate into the grip of the cutting mechanism. This push-bar is connected by bolts 26 to slide-blocks 26' under the plate 10 and rods 27 which are operated by mechanism hereinafter described, are adapted to reciprocate said blocks to operate the push-bar 25. Springs 28 on rods 27 are adapted to retract the push-bar and said rods.

Continuous rotation is imparted to the gang of circular cutters 11 by a shaft 14 to which a pulley 14' is fixed. Intermittent movement is imparted to rods 27 to operate pusher 25, by a pinion 33 on shaft 14, an idler 34 which meshes with said pinion, a gear 35 which meshes with gear 34 and is secured to a shaft 36 and tappets or cams 37 which are fixed to shaft 36, and are adapted to engage abutments 38 on the inner ends of rods 27.

From the lower ends of the cutting devices, the pieces of candy are delivered into chutes which deliver them to two rows of presser devices. The rows of presser devices are relatively offset to provide room for the placement and operation of movable side-members of these devices. Chutes 43 are disposed between the cutting devices and are adapted to deliver pieces of candy into one row of presser devices. Chutes 44 are adapted to deliver pieces of candy into the other row of presser devices, it being understood that the chutes 43 and 44 alternate between the successive cutting devices. In practice, it sometimes occurs that the candy is sticky so that it will not gravitate through the chutes 43, and 44 into the presser devices and mechanism for forcing the pieces of candy through these chutes is provided. A series of arms 80 (Fig. 5) one for each chute 43, are fixed to a rock-shaft 81 and are formed so their terminals 82 will pass between the cutter-devices and through chutes 43 to engage the pieces of candy leaving the cutters and to force them into one row of the presser devices. A series of arms 83 are also fixed to rock-shaft 81 and are alternately arranged with respect to the arms 80. A cross-rod 84 extends through all of the arms 83 and 80 to conjointly shift them and to serve as a pivot for a series of discharge arms 85, the inner ends 86 of which are adapted to pass through the chutes 44 respectively to force the pieces of candy therethrough and into the other row of presser devices. Arms 85 are free to swing on rod 84 so that their inner ends 86 will rest on the lower plates of the chute 44. An additional cross-rod 87 may be used to tie the arms together. These devices exemplify mechanism for positively forcing the pieces of candy through the delivery chutes leading to the presser devices.

The mechanism for oscillating shaft 81 to operate the pusher-arms, comprises a cam 88 on shaft 36, an arm 89 pivoted to the frame at 90 and provided with a roller 91 to engage cam 88, an arm 92 fixed to the outer end of rock-shaft 81, a link 93 between arm 92 and arm 89, and a spring 94 is applied to arm 92. Said spring serves to yieldingly operate and the spring serves to retract the pusher mechanism.

Each presser-device comprises a stationary side wall or member 45 which is fixed on the table 8 and a movable side member formed by a bar 47 which comprises a presser portion 48 to coact with the stationary member 45 of a presser device in one row and a relatively offset portion 49 which coacts with one of the stationary members 45 of the other row. All of the bars 47 are fixed to a pair of rods 50. These rods are suitably guided on the top of the table. A cross-head 52 is fixed to said rods. Reciprocation of the cross-head will operate all of the presser devices. Mechanism for operating the movable side members of the presser-devices, comprises a lever 55 which is connected to cross-head 52 by a bolt 55' which passes through a slot in table 8. Lever 55 is pivoted to the underside of the table 8, as at 56. A rod 58 which is mounted to slide longitudinally in lugs on table 8, is pivotally connected by a bolt 59 to lever 55 and is provided with a roller 61 which is adapted to be operated by a cam 62 on the inner face of a pulley 63 on a shaft 30. A spring 65 is applied to retract rod 58. A gear 95 on shaft 30 meshes with the gear 34 so that all of the mechanism will be driven by power applied to the shaft 14. The details of this mechanism are more fully illustrated and set forth in the aforesaid application, Serial No. 113,475. Table 8 is provided with slots 66 below the rows of presser-devices through which the shaped pieces of candy will be discharged onto a conveyer-belt 68 which is adapted to convey them to any suitable receptacle at the back of the machine. The pieces of candy are temporarily held in the presser devices until they have been gripped between the fixed and movable side members thereof, by bottom-members 67. The bottom-members for one row of presser-devices are mounted on a bar 68' which is pivotally sustained by arms 69 from a rock-shaft 70. The bottom members 67 for the other row of presser devices are mounted on a bar 68' which is mounted on curved arms 69' which are secured to a rock-shaft 70'. The bottom members are adapted to be swung outwardly and downwardly from the presser devices and by providing oppositely and downwardly swinging arms for these bottom members, they will be entirely removed to clear the path through which the pieces of candy fall out of the presser devices.

The mechanism for operating the rock-shafts 70 and 70' for the bottom members 67 comprises a cam 72 on shaft 30 on which the pulley 63 is fixed, a lever 73 pivoted to the frame as at 75 and provided with a roller 74 engaged by cam 72, arms 76 fixed to the rock-shafts 70 and 70' respectively and links 77 between lever 73 and said arms respectively. A spring 78 serves to retract the bottom members and the mechanism for shifting them and to hold lever 73 in operative relation to cam 72.

The invention exemplifies an improved machine for cutting and forming candy which is simple in construction and in which provision is made for positively forcing the pieces of candy from the cutting devices to the presser devices.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a machine of the character described, the combination of a gang of movable devices for cutting a long stick of candy into pieces, presser devices mounted independently of the cutting devices for pressing the severed pieces, mechanism for operating the cutter and presser devices, and power-driven devices for forcing the pieces from the cutting devices to the presser devices.

2. In a machine of the character described, the combination of a gang of movable devices for cutting a long stick of candy into pieces, presser devices mounted independently of the cutting devices for pressing the severed pieces, mechanism for operating the cutter and presser devices, and power-driven devices for forcing the pieces from the cutting devices to the presser devices, comprising a rock-shaft and arms.

3. In a machine of the character described, the combination of a gang of movable devices for cutting a long stick of candy into pieces, presser devices mounted independently of the cutting devices for pressing the severed pieces, mechanism for operating the cutter and presser devices, and power-driven devices for forcing the pieces from the cutting devices to the presser devices, comprising a rock-shaft, arms on the rock-shaft, and members pivoted to said arms.

4. In a machine of the character described, the combination of a gang of devices for cutting a long stick of candy into pieces, presser devices for pressing the severed pieces, mechanism for operating the cutting and presser devices, ducts for separately conducting the pieces into the presser devices, and power-driven devices for pushing the pieces through the ducts.

5. In a machine of the character described, the combination of a gang of devices for cutting a long stick of candy into pieces, presser devices for pressing the severed pieces, mechanism for operating the cutting and presser devices, ducts for separately conducting the pieces into the presser devices, and power-driven mechanism for pushing the pieces through the ducts, comprising a rock-shaft and arms.

6. In a machine of the character described, the combination of a gang of devices for cutting a long stick of candy into pieces, presser devices for pressing the severed pieces, mechanism for operating the cutting and presser devices, ducts for separately conducting the pieces into the presser devices, and power-driven mechanism for pushing the pieces through the chutes, comprising a rock-shaft, arms, and members pivoted to said arms.

7. In a machine of the character described, the combination of a gang of devices for cutting a long stick of candy into pieces, presser devices for the severed pieces, mechanism for operating the cutting and presser devices, ducts to deliver the pieces from the cutting devices into the presser-devices, devices for pushing the pieces through the ducts, mechanism for intermittently delivering a stick of candy to the cutting devices and mechanism for operating the stick-delivery means in timed relation to the pusher and presser devices.

8. In a machine of the character described, the combination of a gang of devices for cutting a long stick of candy into pieces comprising rotating blades spaced from one another and coacting stationary blades having concave edges, mechanism for driving the rotary blades, a feed bar for delivering a stick to the cutting devices, slidable rods connected to said bar, abutments on the rods, cams for operating the abutments, a shaft for said cams, gearing between the rotary cutters and said shaft, and spring-means for retracting the feed bar.

9. In a machine of the character described, the combination of a gang of devices for cutting a long stick of candy into pieces comprising rotating blades spaced from one another and coacting stationary blades having concave edges, mechanism for driving the rotary blades, a feed bar for delivering a stick to the cutting devices, slidable rods connected to said bar, abutments on the rods, cams for operating the abutments, a shaft for said cams, gearing between the rotary cutters and said shaft, and springs coiled around said rods for retracting the feed-bar.

10. In a machine of the character described, the combination of a gang of devices for cutting a long stick of candy into pieces, presser devices to which the pieces are individually conducted from the cutting devices, means for operating the cutting and presser devices, the latter comprising movable bottom members, oppositely swinging arms for shifting said bottom members into and out of operative position, and mechanism for operating said arms.

11. In a machine of the character described, the combination of a gang of devices for cutting a long stick of candy into pieces, presser devices to which the pieces are individually conducted from the cutting devices, means for operating the cutting and presser devices, the latter comprising movable bottom members, oppositely swinging arms for shifting said bottom members into and out of operative position, rock shafts to which the arms are connected, and mechanism for operating said rock shafts.

12. In a machine of the character described, the combination of a gang of cutting devices for severing a stick of candy into pieces, presser devices for the pieces, disposed in a plurality of rows, means for delivering pieces individually from the cutting devices to the rows of presser devices, and devices for pushing the pieces through said delivery devices.

13. In a machine of the character described, the combination of a gang of cutting devices for severing a stick of candy into pieces, presser devices for the pieces, disposed in a plurality of rows, means for delivering pieces individually from the cutting devices to the rows of presser devices, and devices for pushing the pieces through said delivery devices, comprising arms and a rock-shaft.

14. In a machine of the character described, the combination of a gang of cutting devices for severing a stick of candy into pieces, presser devices for the pieces, disposed in a plurality of rows, means for delivering pieces individually from the cutting devices to the rows of presser devices, and devices for pushing the pieces through said delivery devices, comprising arms and a rock-shaft, some of the arms having extensions to pass through the delivery means and pivoted push members on the other arms adapted to force the candy through the other delivery devices.

FRED E ZAISS.

Copies of this patent may be obtained for five cents each, by addressing the "Commissioner of Patents, Washington, D. C."